3,330,809
FLUIDIZED POWDER POLYMERIZATION
PROCESS FOR POLYESTERS
John S. Perlowski, Robert D. Coffee, and Robert B. Edwards, Rochester, N.Y., assignors to Eastman Kodak Company, Rochester, N.Y., a corporation of New Jersey
No Drawing. Filed Mar. 29, 1962, Ser. No. 183,369
16 Claims. (Cl. 260—75)

This invention relates to an improved process for rapidly building up the molecular weight of an intermediate molecular weight linear polyester in the form of prepolymer powder comprising passing hot inert gas through said powder so as to achieve and maintain a fluidized condition, collecting and purifying the effluent gas, recirculating to the fluidized polymer powder said inert gas after it has been purified and continuing this process until the intrinsic viscosity has been substantially increased. Most advantageously, a molecular sieve is used in the purification of the recirculated gas.

Although fluidization apparatus has been used for many purposes, its utility in this field has not been found to be practicable for some obscure reason until the present invention. Thus recirculation of supposedly purified inert gas failed to give rapid build up and prevented the process from having any significant economic or other advantage over other solid phase or melt phase polymerization processes.

It is an object of this invention to provide a fluidized powder polymerization process whereby inert gas can be recirculated in such a way that rapid build up of molecular weight can be achieved in a very short time.

It is a further object to provide a process for producing built-up polymer powder which has surprisingly improved color quality.

It is another object to provide a process for either batch or continuous operation of fluidization apparatus so that the other objects can be achieved.

Additional objects are apparent elsewhere herein.

The following graphic representation of one embodiment of the invention is set forth as a flow diagram in order to assist in illustrating but not limiting this invention:

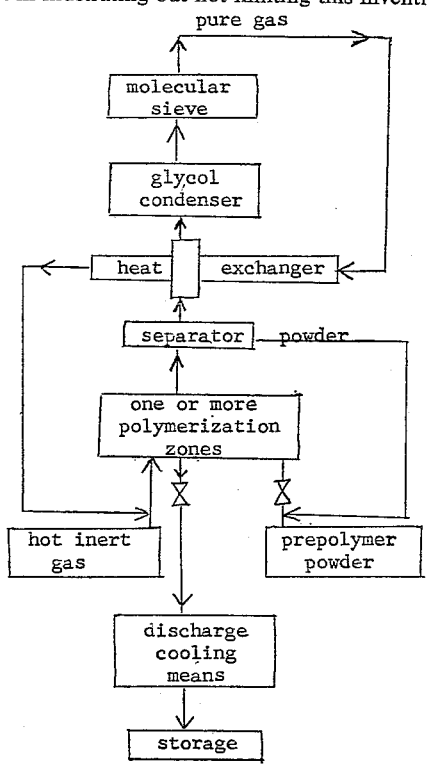

According to one embodiment of this invention there is provided an improved process for rapidly building up the molecular weight of an intermediate molecular weight linear polyester in the form of prepolymer powder comprising passing hot inert gas through said powder so as to achieve and maintain a fluidized condition, collecting and purifying the effluent gas, recirculating to the fluidized polymer powder said inert gas after it has been purified and continuing this process until the intrinsic viscosity has been substantially increased.

According to a more specific embodiment of this invention there is provided an improved process for the rapid build-up of a linear polymer melting above 150° C. composed of bifunctional dicarboxylic acid and glycol constituents in its prepolymer powder form to its build-up powder form which comprises the following steps:

(1) introducing said prepolymer powder, having an intrinsic viscosity in the range of from about 0.2 to about 0.45 as measured at 25° C. in a 60:40 mixture by weight of phenol and tetrachlorobenzene, into a polymerization zone equipped with (a) zone wall temperature control means, and (b) gas distribution means, (2) continuously passing inert gas at about 150° to 300° C. through said prepolymer powder at a rate of at least 2 times the minimum fluidization rate whereby said powder is maintained in said polymerization zone as a fluidized powder, the temperature during polymerization being in the range from about 15° to 75° C. below the melting point of said powder, (3) continuing the passage of said gas into said fluidized powder at a rate of from 2 to 8 times the minimum fluidization rate within said build-up temperature range until an intrinsic viscosity of at least 0.55 is obtained for the built-up polymer powder, (4) continuously transferring said gas containing some of said powder, after it has passed through said fluidized powder, into a separation zone where substantially all particles of powder in said gas are separated from said gas leaving a substantially clear gas, (5) thereafter continuously passing said gas through at least one condenser whereby substantially all of said glycol in the form of vapor in said gas is condensed leaving a substantially purified clear gas, (6) thereafter continuously passing said gas through a zeolitic molecular sieve capable of removing molecules having critical diameters within the range of from about 3 up to about 20 angstrom units, whereby essentially purified gas is obtained, (7) thereafter continuously passing said gas through a heat exchanging relationship with regard to the flow of gas containing some heat following step (3) as defined above, whereby an exchange of heat is achieved in amount such that no more than the sensible heat from glycol vapor in the hotter gas is removed and said essentially purified gas is reheated, (8) then recirculating said reheated gas to said polymerization zone to provide a substantial proportion of the total amount of said gas for said step (2), (9) when an intrinsic viscosity of at least 0.55 has been achieved, removing at least some of said built-up powder from said polymerization zone.

Examples of polyester prepolymers which can be built up by this invention include poly(ethylene terephthalate), poly(ethylene 85 percent terephthalate, 15 percent isophthalate), poly(1,4-cyclohexanedimethylene terephthalate), poly(1,4-cyclohexanedimethylene 80 percent terephthalate, 10 percent adipate), poly(ethylene naphthalene-2,6-dicarboxylate), poly(1,5-pentamethylene sulfonyl-4,4'-dibenzoate), etc. Examples of similarly useful polyesters are given in such patents as U.S. 2,465,319, U.S. 2,901,466, etc. The preparation of prepolymer powder is described in U.S. 2,901,466 and in copending Barkey application Serial No. 97,063, filed March 20, 1961, as well as in other prior art. Hence there is no reason for presenting any further description as to such prepolymers.

One of the especially significant aspects of this invention centers around the use of a fluidization gas rate during the start of period which is sufficient to create and maintain a fluidized condition while the temperature of the powder is increased to the build-up temperature range which is in the range of about 75° to 15° C. below the melting point. The most advantageous build-up temperature takes into consideration the physical properties of the particular prepolymer powder. For example, some copolymers will have a much greater tendency to agglomerate and the temperature should be kept on the low side of this range. As regards poly(ethylene terephthalate), the build-up temperature range is advantageously about 50° to about 35° C. below the melting point, viz., about 205° to 225° C. The melting point for poly(ethylene terephthalate) depends somewhat on the method of manufacture and the technique of measurement and is somewhere around 255° to 260° C.

As another example, the prepolymer described in U.S. 2,901,466, Example 6, from 1,4-cyclohexanedimethanol and 4,4'-sulfonyldibenzoic acid melts at 283° to 287° C. and can be built up by the process of the present invention at a temperature of 75° to 15° C. below the melting point keeping in mind the fact that the melting point gradually increases to 295° to 298° C. so that the inert gas temperature can be increased during build up if an even more rapid rate is desired. Thus a temperature as high as 15° C. below the 295° C. melting point can be used toward the end of the process which could begin at a temperature as low as 75° C. below the 283° melting point at the start, viz., a range of from 208° to 280° C.

A further example is the prepolymer of Example 2 of U.S. 2,901,466 which has a prepolymer melting point of 265° to 270° C. and a built-up melting point of 295° to 305° C. This can be built up in the range of from as low as 180° C. at the start to as high as 280° C. toward the end.

As to homopolymers, the usually most advantageous range is from about 35° to about 50° C. below the melting point. As to copolymers a generally preferred range is about 45° to 60° C. below the melting point.

The initial fluidization gas rate has been quite surprisingly ascertained to necessarily be at about four times or more the minimum fluidization rate as defined by engineering practice relevant to fluidization processes. Some aspects of the various engineering principles which are involved here are discussed in a paper presented to the 54th Annual Meeting of the American Institute of Chemical Engineers on December 6, 1961, by Arthur M. Squires entitled Species of Fluidization which includes several references providing additional information on this subject; in general such information is well known to those skilled in the art and need not be further described in this specification. However, it should be noted that predictability of results in this art is far from becoming a reality. A vast number of variables are involved and each process can be worked out only by the exercise of a high level of ingenuity which was especially necessary in order to discover the process described herein regarding polymerization of polyester prepolymer powder. Those elements of the process which are considered beyond the scope of routine ascertainment by those having ordinary skill in the art are discussed herein so as to teach the practice of this invention to such persons.

An especially unobvious aspect of this invention is concerned with the necessity to use a zeolitic molecular sieve in order to achieve a practicable process employing recirculation of inert gas. Thus various techniques of dust removal, condensation of glycol vapors, filtration in ordinary filter devices, etc., failed to overcome the problem of discoloration of polymer powder and slow down of build-up rate. Hindsight indicates that the inert gas must contain some constituents which may serve as chain-terminating agents, catalysts for decomposition reactions, etc.

Quite surprisingly, it was found that molecular sieves of the zeolite type are capable of removing something from the inert gas which was not known to exist. Thus it would have been thought that ordinary filters and condensers could have accomplished any necessary removal of contaminants, but such was not found to be the case.

The use of molecular sieves is described in the literature but has never heretofore been thought to have any especial relevance to a process such as described herein. For example, a paper in British Chemical Engineering, vol. 4, pages 267 to 279 (May, 1959) describes "New Selective Sorbants: Porous Crystals as Molecular Filters." Various zeolitic molecular sieves are available such as Linde molecular sieves or Zeolon molecular sieves, etc. Thus Zeolon molecular sieves are considered to be synthetic mordenites and are available in both hydrogen ion exchanged form and a sodium form of synthetic zeolites, see Chemical and Engineering News, March 12, 1962, pages 52 and 54. These and other varieties of zeolitic molecular sieves are capable of adsorbing molecules having critical diameters of 4, 5, 13 or other numerical values measured in angstrom units. It appears that the objects of the present invention can best be achieved using such sieves capable of adsorbing molecules having a diameter up to about 20 angstroms. Thus a 13 angstrom pore diameter sieve has been found to be quite satisfactory. The crystal structure of the synthetic zeolite can be either cubic having an A-type crystal structure, an X-type crystal structure, or some other type. The use of molecular sieves having pore diameters as little as 3 angstroms is not as preferable as those having a large pore size, e.g., 10 to 20 angstroms. Since further details as to melecular sieves are available to those having ordinary skill in this field as explained above, no further description of this aspect of the invention is necessary.

The polymerization zone can be of generally conventional design as discussed above. Various designs can be employed such as that illustrated in Canadian Patent 621,559, issued June 6, 1961. Thus the polymerization zone can be provided with agitators, wall scraping devices, stationary baffles, etc. The overall shape can be cylindrical, conical or otherwise. A continuous process can be employed for feeding prepolymer powder into a polymerization zone at the top and withdrawing it at the bottom as illustrated in said Canadian Patent 621,559. Such apparatus and other types of apparatus can be operated on a batch basis. According to one embodiment of this invention there is provided a process as described above wherein said step (1) comprises continuously introducing said prepolymer powder near the top of said polymerization zone and continuously removing built-up polymer powder from near the bottom of said polymerization zone.

According to a more detailed embodiment of this invention there is provided a process as described above wherein said polymerization zone is divided into a plurality of subzones.

According to a more detailed embodiment of this invention there is provided a process as described above wherein said plurality of subzones are provided in a single vertically disposed polymerization vessel.

According to a more detailed embodiment of this invention there is provided a process as described above wherein said polymerization vessel is equipped with a plurality of said gas distribution means located at substantially equidistant points in a vertically disposed relationship such that the overall mass of fluidized powder flows downwardly while the overall quantity of gas flow upwardly.

According to a more detailed embodiment of this invention there is provided a process as described above wherein said polymerization vessel is equipped with a single gas distribution means near the bottom thereof and the vessel is equipped with a plurality of screens of about 1 to 2 mesh size located at substantially equidistant points in a vertically disposed relationship such that said fluidized power flows downwardly in a plug-like manner from screen to screen.

According to a more detailed embodiment of this invention there is provided a process as described above wherein said polymerization zone is provided by a plurality of essentially identical separate polymerization vessels wherein said powder passes downwardly through each one in succession while said gas passes countercurrently upwardly in reverse succession, said gas having substantially all particles of powder removed therefrom prior to passage from one vessel to the next.

According to a more detailed embodiment of this invention there is provided a process as described above wherein said gas passing from one of said vessels to the next is heated to maintain its temperature in said build-up temperature range.

The use of fluidization processes as to polyesters is set forth in French Patent 1,081,457 and involves the formation of glycol vapors rather than the water vapor given off in the formation of a polyamide as illustrated in the above cited Canadian patent. Thus as is readily apparent, the peculiar factors influencing the buildup of polyester prepolymer are substantially and unpredictably different from those applicable to polymers although both are in the same general class of condensation reactions. An illustration of another type of apparatus is given in the abovementioned paper by A. M. Squires; another illustration appears in Canadian Patent 597,286. Numerous other illustrations appear in the art.

The present invention can be illustrated by employing a simple cylindrical fluidization vessel equipped with a gas distribution plate at the bottom. If desired, the gas can be distributed more rapidly at the circumference of the plate so as to cause a greater rate of flow along the outside walls. These walls can be heated electrically or by a jacket containing hot fluid; less desirably than can simply be well insulated to conserve heat.

The hot inert gas which is employed can be nitrogen, hydrogen, helium, argon, as well as other nonreactive, moisture-free gases. This gas can be initially introduced at a higher temperature than after start up in order to arrive at the buildup temperature range as soon as possible. Any convenient means can be used to preheat the gas. Dry nitrogen appears to be the most advantageous gas since it is readily available in dry pure form at a reasonable price. Combustion gas from various industrial operations can also be employed after it is dried and any oxygen or carbon monoxide have been substantially eliminated; however, it has been found that up to about 2 percent oxygen can be tolerated but with less advantageous results.

In one example of the practice of this invention an 18-inch cylindrical polymerization vessel was employed. The walls were electrically heated and the nitrogen fed to the distribution plate was heated electrically so as to allow the gas to be heated to any desirable temperature at a rate of 7 to 36 standard cubic feet per minute (s.c.f.m.). The gas distribution plate near the bottom of the vessel was constructed of porous stainless steel, grade F.

The prepolymer powder was usually fed into the polymerizer so as to rest on the distribution plate, and then the gas flow was started so as to fluidize the powder. The powder preferably all passes through a 20-mesh screen (openings are 0.841 mm.) and as little as possible passes a 200-mesh screen (openings are 0.074 mm.). Finer powder merely increases the cost of separating the duct from the hot gas being recirculated. Powder which is more coarse than 0.841 mm. does not fluidize so well although some small amount thereof can be tolerated. In most cases a size distribution of particles which pass a 40-mesh sieve but do not pass a 300-mesh sieve gives good results.

The depth of the bed was varied between 18 inches and 27.5 inches. Prepolymer powder was added in different cases to both cool and preheated beds.

A serious problem in the process of this invention was caused by the tendency of the bed of prepolymer powder to lump together or freeze up. Quite surprisingly when heating up a bed of poly(ethylene terephthalate) prepolymer powder through the temperature range of about 80° C. to about 100° C., the powder sinters and prevents fluidization from taking place. This prevents movement of particles and the gas flows through blow holes. It may be that this sintering is caused by the formation of glycol vapors which may wet the particles but this explanation is not necessarily valid. In any case there is a transition zone at which the bed sets up and difficulties arise. This sintering temperature transition zone is different for different polymers.

It was found that previously built-up polymer can be heated through this transition zone with no apparent sintering. This fact led to several tests in which polymer was heated to temperature and then the prepolymer was added continuously. Powder was withdrawn continuously to maintain a constant level. This prevented the bed from setting up. However, small amounts of polymer adhered to the walls, causing poor heat transfer.

In order for batch polymerization to be practical, a method of avoiding bed sintering was necessary. High gas rates were found to maintain the particles separated sufficiently to avoid this sintering. A flow rate of over four times the minimum fluidization rate was found to be necessary. The minimum fluidizing velocity is 5.52 s.c.f.m.; the necessary rate is 26.2 s.c.f.m. Polymer was made using this method by heating the bed and the prepolymer simultaneously with high gas rates. Slow heat-up rates were used in the critical zone. The slow addition of prepolymer powder to a heated bed was also used successfully. Since the powder addition was 120 pounds per hour, the bed was never in the critical temperature zone. The cool powder hitting the heated bed was instantly heated to a minimum of 132° C. The latter method was found to be very reliable in preventing sintering. This procedure can also be duplicated easily on plant scale.

The hot gas leaving the polymerizer was separated from particles of prepolymer using a cyclone separator followed by a standard commercial dust filter. Any other arrangement well known in chemical engineering practice could be employed.

The amount of dust carry-over was determined in order to size the cyclone and the dust filter. Approximately 6 percent to 7 percent carry-over was experienced. At the necessary velocities, the minimum particle size that will settle is approximately 200 mesh. Since there was about 11 percent 200-mesh particles in the original prepolymer, it is thought that the remaining small particles agglomerated or adhered to larger particles. The amount of carry-over can be minimized by limiting the high gas velocity to the critical sintering temperature transition zone.

The hot gas leaving the cyclone separator and before it enters the filter was then led through a heat exchanger in order to recover as much heat as possible. This can be done at any point deemed most suitable and was done in this case prior to the dust filter since the filter used was subject to injury at a high temperature.

During the first part of the build up of the prepolymer, the glycol given off is at its greatest rate. Hence the dew point of glycol vapor must be more carefully observed at this stage of a batch process or during the early stages of a continuous process in order to prevent condensation of glycol in this heat exchanger which is designed to remove sensible heat; the latent heat is removed in the zone where glycol vapor is condensed.

The condensation zone is designed to remove practically all of the glycol vapor. A standard type commercially available water cooled condenser can be used to perform this task. It is also preferable to use a refrigerated condenser. The amount of glycol vapor in the inert gas should be such that the inert gas has a dew point of below 0° C., preferably below −30° C. and most advantageously below −60° C.

At this stage of the process it would seem that the cooled gas could be reheated and recirculated to the polymerization zone with excellent results since theoretically the removal of dust and glycol vapor is the only apparent requirement prior to recirculation. It was, therefore, most unobvious to discover that there was still something that could be removed from the inert gas whereby much more rapid build-up would take place in the polymerization zone and the build-up polymer would have a quite superior color quality. Thus the use of a molecular sieve was found to provide a most unexpected advantage since it did not seem from an ordinary viewpoint to be necessary in such a process.

The arrangement of the molecular sieve material is in itself quite standard in accordance with procedures well known in other fields. A receptacle containing the zeolitic molecular sieve material in the form of a bed of pellets can be provided with an inlet and outlet for the gas passing through the bed. For example, Linde 13X molecular sieve pellets can be employed to remove what appears to possibly include such contaminants as acetaldehyde, 2-methyl-1,3-dioxolane, glyoxal, methanol, water, etc. Such materials not only result in increased color in the poly(ethylene terephthalate) product, but also limit the degree and rate of polymerization.

In regenerating the molecular sieves with hot air, it is necessary to first remove most of the organics by replacing them with adsorbed water in order to prevent rapid oxidation of the organics, resulting in localized overheating and degeneration of the molecular sieve material.

Two adsorbent beds, each containing about 140 pounds of 13X molecular sieves, can be employed, one being regenerated while the other is being used. An average of twenty-four 600-pound batches of product can be produced before regeneration is required. The regeneration procedure is essentially as follows: (1) when the dew point of the effluent gas rises above −35° C., air at 38° C. and containing about 3 percent water vapor by weight is passed through the molecular sieves at a rate of 260 s.c.f.m. for 6 hours; (2) the steam which provides the water vapor is then shut off, the air is then electrically heated to 316° C. and passed through the molecular sieves for about 6 hours at a rate of 260 s.c.f.m.; (3) at the end of this period, the electric air heaters are turned off and air flow is continued at 260 s.c.f.m. for about 2 hours until the temperature of the outlet air has dropped to about 93° C., the air supply is then shut off and the bed allowed to cool.

Necessary pumps and conduits of standard design are used to conduct the gas from the polymerization zone through the zones of particle separation, glycol condensation, molecular sieve treatment and reheating. The pumping system can be employed so that the fluidization reaction zone where the polymer build up takes place is either at atmospheric pressure or at a somewhat higher or lower pressure. It has been found preferably to operate at somewhat in excess of atmospheric pressure, viz., about 2 to 10 pounds/sq. in. gauge pressure. That this produces good results is in itself surprising since those skilled in the art relating to polymerization of such polyesters have generally considered that reduced pressure is most advantageous.

As illustrative of the operation of the polymerization zone an 18-inch diameter vessel was used. It was jacketed with electric heaters and preheated to 222° C. Nitrogen, preheated to 204° C. was passed upward through a porous sintered metal plate at the bottom of the fluidization polymerizer vessel and through the empty bed at 28.4 s.c.f.m. A prepolymer of poly(ethylene terephthalate) having an intrinsic viscosity (I.V.) of 0.39 was added slowly by means of a screw feeder located at the top of the fluidization vessel. Eighty-six pounds of powder was charged to the bed in 50 minutes. Twenty-five minutes after the powder addition was completed the entire bed was at 218° C. which was the temperature selected for build up of the propolymer. Every hour thereafter a sample was removed from the bed and analyzed as follows:

| Hours at 218° C. | I.V. | Color Value |
|---|---|---|
| 0 | 0.44 | 18.6 |
| 1 | 0.61 | 18.7 |
| 2 | 0.71 | 19.4 |
| 3 | 0.76 | 19.8 |
| 4 | 0.80 | 19.9 |

During this fluidization process the wall temperature was maintained at 221° C. and the gas pressure above the bed was kept at 2 p.s.i.g.

However, it was unexpectedly found that best results can be achieved having the wall temperature no greater than the bed temperature whereby the tendency for particles to adhere to the walls is practically eliminated.

Using the same equipment as just described with the bed and gas heated in the same manner, ninety pounds of the same prepolymer having an I.V. of 0.39 was introduced using a gas rate of 25.3 s.c.f.m. The build-up temperature was 217° C. and when the bed reached this temperature, powder was continuously added near the top and withdrawn near the bottom of the bed at a rate of 20 pounds per hour whereby the average residence time of the powder in the bed was about 4.5 hours. The results were as follows measured after the reaction temperature was reached and powder withdrawal was begun:

| Hours at 217° C. after continuous draw-off started | I.V. | Color Value |
|---|---|---|
| 0 | 0.58 | 19.5 |
| 1 | 0.60 | 20.2 |
| 2 | 0.61 | 20.4 |
| 3 | 0.64 | 22.0 |

Both of the preceding tables of data show the results achieved when pure fresh nitrogen is continuously supplied without recirculation. When an attempt was made to carry out these same processes using recirculated nitrogen after removal of dust and glycol, the I.V. build-up rate dropped and the maximum I.V. obtainable was about 0.55; moreover, the color values increased to well above 30 so that a practicable process was not obtainable. However, when a molecular sieve is employed the build-up rate is not adversely affected and color values of 18 or lower can be obtained.

The processes described above for using the 18-inch fluidization vessel were also conducted in a continuous manner. The gas distribution element was made of sintered stainless steel having a 20-micron pores. The inside walls of the vessel were of chromium plated copper. All other parts were of 304 stainless steel. Powder was fed into the vessel through a screw feeder. Built-up powder was removed from the bottom through an outlet valve starting the removal after the build-up temperature for the bed was achieved and additional prepolymer powder was fed at the same rate. The following tables will illustrate the results achieved:

I. The operating conditions were:
 (1) Powder feed rate _____lbs./hr___ 16.5
 (2) I.V. of feed _____ 0.38
 (3) N$_2$ rate _____s.c.f.m__ 34
 (4) N$_2$ temperature _____° C__ 204
 (5) Bed temperature _____° C__ 213
 (6) Wall temperature _____° C__ 232
 (7) I.V. of product _____ 0.64
 (8) Level in bed _____in__ 21.5

The product was white in color and of excellent overall quality.

II. The operating conditions were:
 (1) Powder feed rate _____lbs./hr___ 41
 (2) I.V. of feed _____ 0.38
 (3) N$_2$ rate _____s.c.f.m__ 28
 (4) N$_2$ temperature _____° C__ 243
 (5) Bed temperature _____° C__ 212
 (6) Wall temperature _____° C__ 249
 (7) I.V. of product _____ 0.58
 (8) Level in bed _____in__ 22

The product was white in color and of excellent overall quality.

The color value figures are based on the Gardner-Holtz color scale. The use of the recirculation process steps employing a molecular sieve in various instances reduces the color by at least 75 percent and at least doubles the rate of build up as compared to recirculation without the use of a molecular sieve.

It is important to maintain the initial gas velocity above 0.436 feet/second (26.2 s.c.f.m.). Although this is four times the minimum fluidizing velocity, it is necessary to prevent agglomeration. The prepolymer of poly(ethylene terephthalate) sinters quite rapidly at 80° to 100° C.; hence it is desirable to go through this range rapidly. Therefore, the top stage when a plurality of stages is employed (as described above) should be maintained at 120° to 150° C. or higher so as to allow the feed powder to pass through the sintering range quickly. When a multi-stage system is used, it is generally advantageous to employ from 3 to 6 stages such as six separate vessels as described above. When the temperature of the bed is above about 100° C., the gas velocity can, if desired, be reduced to two times the minimum fluidization velocity. This 100° C. value is different for other polymers than poly(ethylene terephthalate) and in general can be set at up to about 150° C. depending upon the prepolymer and its I.V. value.

As the N$_2$ is recirculated it is imperative that all water and organic constituents be removed. The dew point of the supply gas should be most advantageously below −60° C.

Preheating of the prepolymer powder may be employed in place of internal heating surfaces inside the reactor. External heating by passing the powder through a shell and tube heater may also be used in place of internal heating surfaces.

The countercurrent flow of gas and powder is advantageously employed so as to allow the highest I.V. powder to be in contact with the purest N$_2$. Since the polymerization slows downs as the I.V. increases, it is desirable to have the maximum driving force. This is attained by countercurrent flow.

The specific processes described with regard to the build up of poly(ethylene terephthalate) can be similarly employed using prepolymer powder of poly(1,4-cyclohexanedimethylene terephthalate), poly(ethylene 90 percent terephthalate, 10 percent isophthalate), poly(1,4-tetramethylene 2,6-naphthalenedicarboxylate) and other prepolymers such as mentioned above.

Although the invention has been described in considerable detail with reference to certain preferred embodiments thereof, it will be understood that variations and modifications can be effected without departing from the spirit and scope of the invention as described hereinabove and as defined in the appended claims.

We claim:
1. An improved process for rapidly building up the molecular weight of an intermediate molecular weight linear polyester in the form of prepolymer powder comprising passing hot inert gas through said powder so as to achieve and maintain a fluidized condition, collecting and purifying the effluent gas, recirculating to the fluidized polymer powder said inert gas after it has been purified and continuing this process until the intrinsic viscosity has been substantially increased, said purifying being accomplished by passing said gas through a zeolitic molecular sieve capable of removing molecules having critical diameters within the range of from about 3 up to about 20 angstrom units whereby said purified gas is obtained.

2. The process of claim 1 wherein said polyester is poly(ethylene terephthalate).

3. The process of claim 1 wherein said polyester is poly(1,4-cyclohexanedimethylene terephthalate).

4. An improved process for the rapid build-up of a linear polymer melting above 150° C. composed of bifunctional dicarboxylic acid and glycol constituents in its prepolymer powder form to its built-up powder form which comprises the following steps:

(1) introducing said prepolymer powder, having an intrinsic viscosity in the range of from about 0.2 to about 0.45 as measured at 25° C. in a 60:40 mixture by weight of phenol and tetrachlorobenzene, into a polymerization zone equipped with (a) zone wall temperature control means, and (b) gas distribution means, (2) continuously passing inert gas at about 150° to 300° C. through said prepolymer powder at a rate of at least 2 times the minimum fluidization rate whereby said powder is maintained in said polymerization zone as a fluidized powder, the temperature during polymerization being in the range of from about 15° to 75° below the melting point of said powder, (3) continuing the passage of said gas into said fluidized powder at a rate of from 2 to 8 times the minimum fluidization rate within said build-up temperature range until an intrinsic viscosity of at least 0.55 is obtained for the built-up polymer powder.

(4) continuously transferring said gas containing some of said powder, after it has passed through said fluidized powder, into a separation zone where substantially all particles of powder in said gas are separated from said gas leaving a substantially clear gas, (5) thereafter continuously passing said gas through at least one condenser whereby substantially all of said glycol in the form of vapor in said gas is condensed leaving a substantially purified clear gas, (6) thereafter continuously passing said gas through a zeolitic molecular sieve capable of removing molecules having critical diameters within the range of from about 3 up to about 20 angstrom units, whereby essentially purified gas is obtained.

(7) thereafter continuously passing said gas through a heat exchanging relationship with regard to the flow of said gas containing some heat following step (3) as defined above, whereby an exchange of heat is achieved in an amount such that no more than the sensible heat from glycol vapor in the hotter gas is removed and said essentially purified gas is reheated, (8) then recirculating said reheated gas to said polymerization zone to provide a substantial proportion of the total amount of said gas for said step (2), (9) when an intrinsic viscosity of at least 0.55 has been achieved, removing at least some of said built-up powder from said polymerization zone.

5. The process of claim 4 wherein said linear polymer is poly(ethylene terephthalate).

6. The process of claim 5 wherein said polymer as prepolymer has an initial intrinsic viscosity of from about 0.35 to about 0.45.

7. The process of claim 4 wherein said linear polymer is poly(1,4-cyclohexanedimethylene terephthalate).

8. The process of claim 4 wherein said step (2) is preceded during the start up period by passing said inert gas into said powder at a rate of at least 4 times the minimum fluidization rate during the period that the powder is in the temperature range below about 150° C.

9. The process of claim 4 wherein said step (9) comprises passing said built-up powder through conveying means provided with heat exchanging means whereby said hot built-up powder is cooled by at least 50° C. prior to being collected as a passive mass of powder.

10. The process of claim 4 wherein said step (1) comprises continuously introducing said prepolymer powder near the top of said polymerization zone and continuously removing built-up polymer powder from near the bottom of said polymerization zone.

11. The process of claim 10 wherein said polymerization zone is divided into a plurality of subzones.

12. The process of claim 11 wherein said plurality of subzones are provided in a single vertically disposed polymerization vessel.

13. The process of claim 12 wherein said polymerization vessel is equipped with a plurality of said gas distribution means located at substantially equidistant points in a vertically disposed relationship such that the overall mass of fluidized powder flows downwardly while the overall quantity of gas flows upwardly.

14. The process of claim 12 wherein said polymerization vessel is equipped with a single gas distribution means near the bottom thereof and the vessel is equipped with a plurality of screens of about 1 to 2 mesh size located at substantially equidistant points in a vertically disposed relationship such that said fluidized powder flows downwardly in a plug like manner from screen to screen.

15. The process of claim 11 wherein said polymerization zone is provided by a plurality of essentially identical separate polymerization vessels wherein said powder passes downwardly through each one in succession while said gas passes countercurrently upwardly in reverse succession, said gas having substantially all particles of powder removed therefrom prior to passage from one vessel to the next.

16. The process of claim 15 wherein said gas passing from one of said vessels to the next is heated to maintain its temperature in said build-up temperature range.

References Cited

UNITED STATES PATENTS

| 2,901,466 | 8/1959 | Kibler et al. | 260—75 |
| 2,933,476 | 4/1960 | Fisher | 260—75 |
| 2,973,341 | 2/1961 | Hippe et al. | 260—75 |
| 3,031,433 | 4/1962 | Monroe | 260—95 |
| 3,066,116 | 11/1962 | Schiller et al. | 260—75 |
| 3,192,184 | 6/1965 | Brill et al. | 260—95 |

DONALD E. CZAJA, *Primary Examiner.*

LEON J. BERCOVITZ, *Examiner.*

R. W. GRIFFIN, *Assistant Examiner.*

UNITED STATES PATENT OFFICE
CERTIFICATE OF CORRECTION

Patent No. 3,330,809                                          July 11, 1967

John S. Perlowski et al.

It is hereby certified that error appears in the above numbered patent requiring correction and that the said Letters Patent should read as corrected below.

Column 2, line 50, after "of" insert -- said --; column 3, line 6, for "of" read -- up --; column 4, line 36, for "large" read -- larger --; column 5, line 29, for "polymer" read -- polyamides --; line 41, for "than" read -- they --; column 6, line 74, before "zone" insert -- next --; column 7, line 17, for "build" read -- built --; column 8, line 9, for "propolymer" read -- prepolymer --; column 9, line 64, for "downs" read -- down --.

Signed and sealed this 15th day of October 1968.

(SEAL)
Attest:

Edward M. Fletcher, Jr.                                     EDWARD J. BRENNER
Attesting Officer                                             Commissioner of Patents